No. 815,083. PATENTED MAR. 13, 1906.
W. E. FISHER.
HAY PRESS.
APPLICATION FILED SEPT. 23, 1903.

3 SHEETS—SHEET 1.

Witnesses
Charles Morgan
Fred C Jones

Inventor
W. E. FISHER.
by Chandlee & Chandlee
Attorneys

No. 815,083. PATENTED MAR. 13, 1906.
W. E. FISHER.
HAY PRESS.
APPLICATION FILED SEPT. 23, 1903.

3 SHEETS—SHEET 2.

Witnesses
Charles Morgan
Fred C. Jones

Inventor
W. E. FISHER
by Chandlee & Chandlee
Attorneys

No. 815,083. PATENTED MAR. 13, 1906.
W. E. FISHER.
HAY PRESS.
APPLICATION FILED SEPT. 23, 1903.

3 SHEETS—SHEET 3.

Witnesses
Charles Morgan
Fred C Jones

Inventor
W. E. FISHER.
by Chandler & Chandler
Attorneys

UNITED STATES PATENT OFFICE.

WALDO E. FISHER, OF COLLINSVILLE, ILLINOIS.

HAY-PRESS.

No. 815,083.  Specification of Letters Patent.  Patented March 13, 1906.

Application filed September 23, 1903. Serial No. 174,289.

*To all whom it may concern:*

Be it known that I, WALDO E. FISHER, a citizen of the United States, residing at Collinsville, in the county of Madison, State of Illinois, have invented certain new and useful Improvements in Hay-Presses; and I do hereby declare the following to be a full, clear, and exact description of the invention, such as will enable others skilled in the art to which it appertains to make and use the same.

This invention relates to baling-presses; and it has for its object to provide a press for baling hay, straw, and similar material in which there will be great strength and rigidity when the parts are in their operative positions and in which a portion of the power member may be telescoped into the baling-chamber to shorten the length of the press when desired.

A further object of the invention is to provide a simple and efficient tucking mechanism for tucking the material at the rear end of the bale, and, furthermore, to provide a bale-chute which may be readily expanded to permit of removal of the last bale formed and to permit of insertion of a bale when the baling operation begins.

Other objects and advantages of the invention will be understood from the following description.

Figure 1:
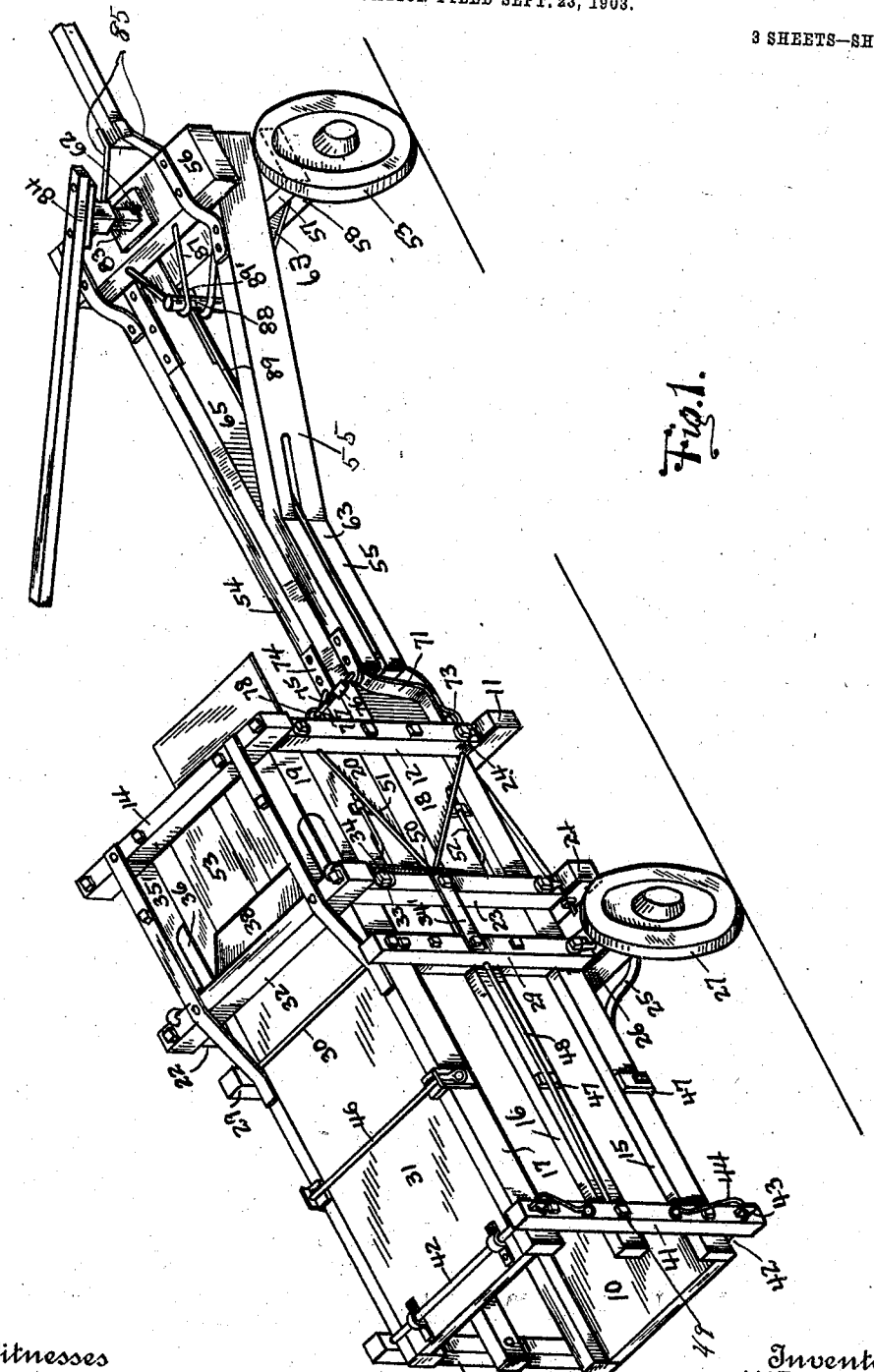
Figure 2:
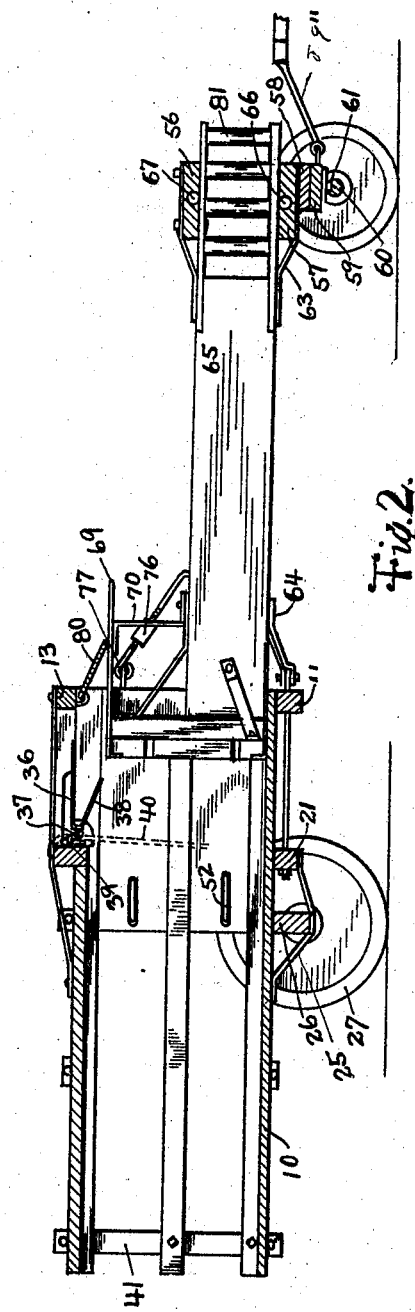
Figure 3:
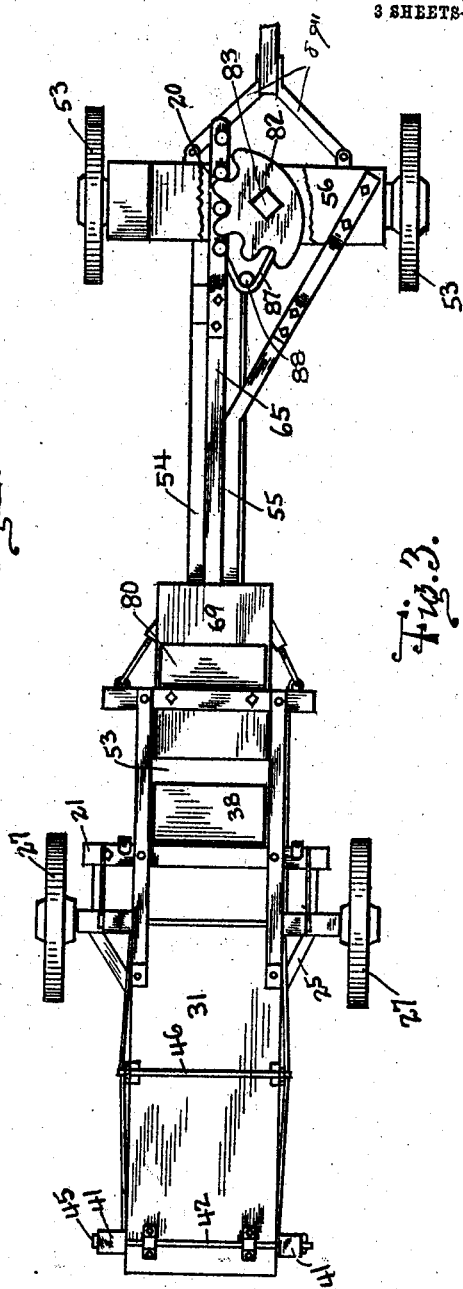
Figure 6:
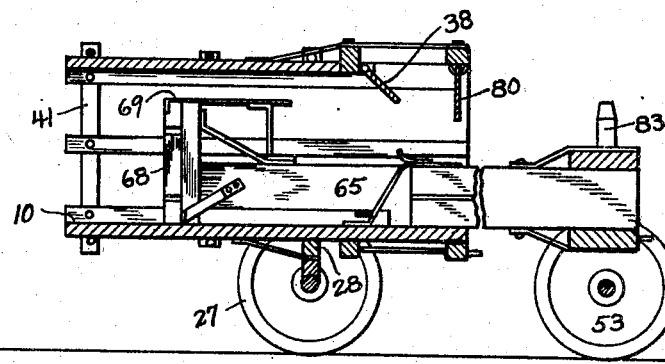
Figure 7:
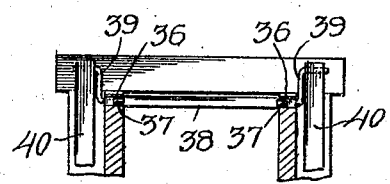
Figure 5:
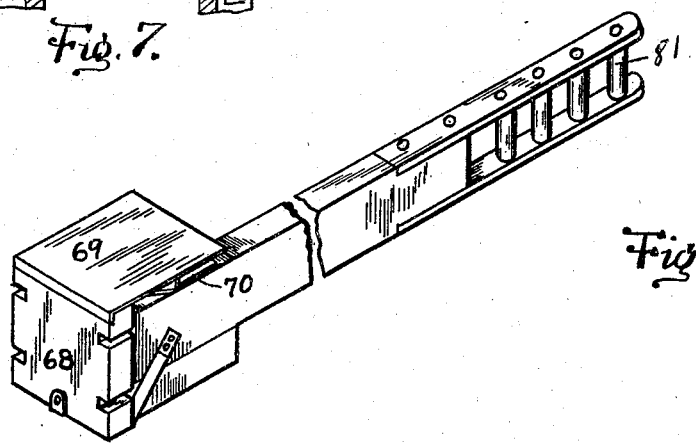
Figure 4:
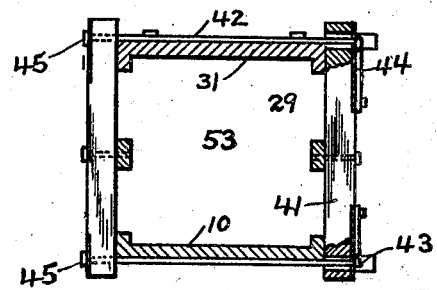

In the drawings forming a portion of this specification, in which like numerals of reference indicate similar parts in the several views, Figure 1 is a perspective view showing a baling-press embodying the present invention. Fig. 2 is a vertical section taken longitudinally through the complete press. Fig. 3 is a top plan view of the press, parts thereof being broken away. Fig. 4 is a vertical section taken transversely through the rear uprights of the bale-chute, showing the means for permitting of expansion of the bale-chute. Fig. 5 is a perspective view of the forward end of the plunger with the head thereof. Fig. 6 is a vertical section taken longitudinally through the press with the parts thereof shifted into position for transportation. Fig. 7 is a detail view, partly in section, showing the mounting of the tucker-plate and adjacent parts.

Referring now to the drawings, there is shown a baling-press comprising what may be termed for convenience a "power" member, comprising the plunger and the means for reciprocating it, and a bale member comprising a baling-chamber in which the material is compressed or baled, and a bale-chute through which the completed bale is passed and from which it is finally discharged.

The bale member comprises a bottom 10, against the under side of which and at the front end thereof is bolted a cross-beam 11, which projects beyond the sides of the bale member and has mounted thereon the uprights 12 and 13, fixed to the upper ends of which is the front upper cross-beam 14. The sides of the bale member are each formed of the longitudinal slats 15, 16, and 17, extending throughout the length of the baling member, there being short slats 18 filled in between slats 15 and 16 at their front end portions and a short slat 19 disposed upon the upper face of the front end portion of the slat 17 and separated from the slat 16 by the longitudinal slat 20. In the rear of the cross-piece 11 is a cross-piece 21, upon the ends of which are mounted the uprights 22 and 23, which are in contact with the outer faces of the several slats and to which slats 15, 16, and 17 are bolted. All of the slats of the sides are bolted to the inner faces of the uprights 12 and 13, and it will be noted that the bolts which connect the lowermost slats 15 to the uprights are engaged through the eyes at the upper ends of eyebolts 24, which are engaged downwardly through the cross-pieces 11 and 21 and have nuts at their lower ends. The eyebolts that pass through the cross-beam 21 pass also through bracing-straps 25, which are bolted to the under side of the axle 26, these brace-straps being continued rearwardly and upwardly and bolted to the lower edges of the slats 15. The axle 26 is provided with supporting-wheels 27.

Upon the axletree 28, on which the axle is mounted, are disposed uprights 29, one at each side of the press member and which are connected at their upper ends by the tie-rod 30, which lies above the top 31 of the bale-chute. Upon the upper ends of the uprights 23 is disposed a cross-beam 32, which is secured to said uprights by means of the eyebolts 33, through the eyes at the lower ends of which are engaged bolts 34, by means of which the uprights 23 are connected to the upper slats 17. Straps 34' connect the uprights 23 with the uprights 29 at points substantially midway of their heights. The top of the press member is open between the cross-beams 14 and 32 to form a hopper for supplying material to the bale, and sides for the hopper above the top 31 of the bale of the chute are formed by short slats 35, the under sides of which are cut away at their rear end, and between which slats and the slat 17 are gripped the ends of spring-plates 36, having loops at their forward ends which receive the trunnions 37 of a tucker-plate 38, the outer ends of these trunnions being bent to form crank-arms 39, that engage beneath spring-plates 40, which are secured at their lower ends to the front faces of the uprights 23, while their upper ends are bent rearwardly over the cross-beam 32. These spring-plates 40 hold the tucker-plate yieldably in substantially horizontal position, but with a slight inclination, but permit of swing of the tucker-plate into vertical position during the tucking operation. The spring-plates 36 hold the tucker-plate yieldably against bodily vertical movement.

Against the side of the bale-chute at the rear end of the latter are disposed the uprights 41, which are bolted to the slats 15, 16, and 17 and which are connected above and below the bale-chute by the tie-rods 42. The tie-rods are passed loosely through the upright 41 at one side, and their projecting ends have perforations 43 therein, with which are engaged the removable latch-hooks 44, which are pivoted to the upright at that side of the chute. When the latches are engaged with the perforations, the uprights 41 are held in such close relation that the sides of the chute converge slightly rearwardly, so that the bale will be held against free movement through the chute and will act to hold the bale-board against movement to a sufficient degree to permit of proper compression of the next bale against the board. By tightening up the nuts 45 at the opposite ends of the tie-rods 42 the convergence of the sides may be increased so that greater pressure will be required to force the bale through the chute, and greater compression of the bale will result. To prevent spreading of the rails 15 and 17, tie-rods 46 are disposed transversely of the upper and lower sides of the bale-chute and are engaged through angle-irons 47, which hug the outer faces of the slats. To prevent spreading of the slats 16, truss-bars 48 are engaged with the bolts 49 at the rear end of the bale-chute, which connect the slats to the uprights 41, and these truss-bars diverge from the slats forwardly to the supporting blocks or bridges 47' midway of the ends of the slats and then converge toward the slats and pass between them and the uprights 29 and 23. Between the latter and the sides of the bale-chute they are connected to the bight portions 50 of V-shaped bars 51, the ends of which are engaged through the upper and lower ends, respectively, of the uprights 12 and 13, to which they are connected or in engagement, with which they are held by means of nuts.

The usual spring-latch fingers 52 are attached to the outer faces of the sides of the baling-chamber 53, and their free end portions work in slots in the sides of the baling-chamber, their extremities passing into the baling-chamber, so that they may engage and hold the baling-board against return movement after the bale is pressed from the baling-chamber into the bale-chute. Supporting-wheels 27 are provided for the axle and support the baling member.

In connection with the baling member hereinbefore described is employed what may be termed a "power" member, which carries the plunger and by means of which the plunger is reciprocated. This power member comprises a beam 54 and a beam 55, the rear ends of which are parallel and in spaced relation, while the forward end portion of the beam 55 diverges laterally from the beam 54, the forward ends of these beams being held between cross-beams 56 and 57, the latter of which is bolted to a bolster 58, which is connected to the axletree 59 of the front axle 60 by means of an ordinary king-bolt 61, which is continued upwardly through the beam 57, the lower end of the king-bolt being headed, while the upper end is perforated to receive a cotter-pin 62. Suitable braces 63 are bolted to the longitudinal beams 54 and 55 and to the cross-beams 56 and 57 to produce a rigid structure, while the rear end portions of the beams 54 and 55 are connected by transverse pieces 64, which form a rest for the plunger 65, which extends forwardly between and beyond the cross-beams 56 and 57, where it works between upper and lower friction-rollers 66 and 67. The plunger 65 is provided with a head 68, suitably braced and attached to the upper face of which head is a plate 69, which extends forwardly of the machine over the plunger and is supported at its free end portion by a bracket 70. The extremity of the plate is continued beyond this bracket so that it may yield downwardly. The power member of the press is connected to the bale member by means of the brackets 71 at the rear ends of the beams 54 and 55, and which brackets are bolted to eyebolts 73, that are passed through the cross-beams 11 and 21 and are provided with nuts which impinge against the latter and hold the eyebolts against longitudinal movement. Metal straps 74 are bolted to the upper faces of the beams 54 and 55 and are perforated for engagement of hooks 75, which are connected, by means of turnbuckles 76, to eyebolts 77, having their eyes pivotally engaged in the eyes of eyebolts 78, the stems of which are engaged through and fasten in the uprights 12 and 13. By means of the turnbuckles the two members may be drawn together, so as to hold them rigidly under the ordinary strains to which the press is subjected in operation.

The plunger-head is passed into the front end of the body of the bale member beneath the cross-beam 14. A plate 80 is swung pivotally from the cross-beam 14, and the lower edge thereof hangs in the path of movement of the plunger-head, so that when the material to be baled is pressed downwardly into the baling-chamber this pivoted plate will prevent it from lodging upon the top of the plunger-head, but will guide it down into the baling-chamber.

To reciprocate the plunger, the forward end thereof is provided with what may be termed a "roller-rack," consisting of vertically-mounted rollers 81, which are disposed for engagement by the teeth of a mutilated gear-wheel 82, which is mounted upon a king-bolt 83, which is journaled in bearings in the cross-beams 56 and 57. The upper end of this shaft is squared for engagement through a sweep 84, by means of which the mutilated gear is oscillated or is rotated to cause the plunger to move into and out of the baling-chamber. Hounds 85 are connected to the front axletree, and when the machine is to be transported the sweep is disengaged from the gear-shaft and is bolted to the hounds, and at the same time the beams 54 and 55 are disconnected from the eyebolts and hooks of the baling member and are telescoped into the bale member, so as to shorten the machine and facilitate transportation.

To further brace the power member, yoke-bars 87 are engaged with the cross-beams 56 and 57, and in their bight portions is disposed an upright bar 88, through which is engaged a tie-rod 89, which is passed through a slot in the beam 55 and is connected to the rear end of the latter.

In the operation of the machine the plunger is reciprocated through the medium of the sweep and mutilated gear and the material to be baled is fed down through the hopper and into the baling-chamber, the usual baling-boards being used between the bales and the tucker-plate 38 being operated to force the material down in the usual manner. By the use of the horizontal plate at the top of the plunger-head the material to be baled may be heaped into the hopper, while the plunger is advanced and the material is prevented from falling behind the plunger-head.

What is claimed is—

1. In a baling-press, the combination with a hopper, of a tucker-plate having crank-arms at its ends, said plate being pivotally and vertically movable, spring-plates engaged over the crank-arms adjacent to the ends of the plate and adapted to hold the plate yieldably against upward movement, and vertical spring-plates engaged against the sides of the outer arms and adapted to hold the latter yieldably against lateral movement.

2. In a baling-press, the combination with a chute including longitudinal slats, of uprights secured to the slats in spaced relation at opposite sides of the chute, the uprights at each side being spaced from each other longitudinally of the chute, cross-rods engaged through the uprights at the discharge end of the chute, said cross-rods having adjusting-nuts at one end outwardly of one of the uprights and extending outwardly beyond the other upright and having perforations in said outwardly-extending portions, latch members carried by the last-named upright and removably engaged in the perforations to hold the rods against removal from the uprights, said rods being arranged to hold the slats at opposite sides of the chute in convergent relation toward the discharge end of the chute, transverse brace-rods secured to the uppermost and lowermost pairs of slats, and truss-rods for the intermediate slats to hold the latter against outward movement between the uprights, said truss-rods having their ends engaged between their respective slats and the uprights.

In testimony whereof I affix my signature in presence of two witnesses.

WALDO E. FISHER.

Witnesses:
GEORGE MUENCH,
JOHN PARSCH.